United States Patent [19]

Mistretta

[11] Patent Number: 4,966,541
[45] Date of Patent: Oct. 30, 1990

[54] SHEETING HEAD STRIPPER WIRE ADJUSTER

[76] Inventor: Joseph L. Mistretta, 3177 Mohawk Trial, Riverside, Calif. 92503

[21] Appl. No.: 342,118

[22] Filed: Apr. 24, 1989

[51] Int. Cl.$^5$ .............................................. A21C 3/02
[52] U.S. Cl. ...................................... 425/229; 264/169; 264/175; 425/230; 425/363; 425/436 R; 426/389; 426/502
[58] Field of Search ............... 425/203, 208, 223, 227, 425/229, 230, 363, 436 R; 264/175, 349; 426/389, 517, 502

[56] References Cited

U.S. PATENT DOCUMENTS

| 324,529 | 8/1885 | Bromley et al. | 425/363 |
|---|---|---|---|
| 1,430,265 | 9/1922 | Sexauer | 425/230 |
| 2,055,205 | 9/1936 | Pereyra | 425/363 |
| 2,071,035 | 2/1937 | Jenett | 425/223 |
| 2,488,189 | 11/1949 | Hanson | 425/203 |
| 2,537,395 | 1/1951 | Brown | 425/208 |
| 2,586,607 | 2/1952 | Brown | 264/349 |
| 2,693,154 | 11/1954 | Appleton | 425/363 |
| 2,788,752 | 4/1957 | Rhodes | 425/363 |
| 3,429,282 | 2/1969 | Ruiz | 425/230 |
| 4,405,298 | 9/1983 | Blain | 425/363 |

Primary Examiner—Jay H. Woo
Assistant Examiner—James P. Mackey
Attorney, Agent, or Firm—William H. Maxwell

[57] ABSTRACT

A stripper wire adjuster for sheeting heads having dough into sheet form between a pair of driven rollers and separated from one roller by the stripper wire held engaged under tension by guides positioned to align the stripper wire with opposite end peripheries of the roller and characterized by infinitely variable positioning of the stripper wire.

16 Claims, 1 Drawing Sheet

U.S. Patent        Oct. 30, 1990        4,966,541
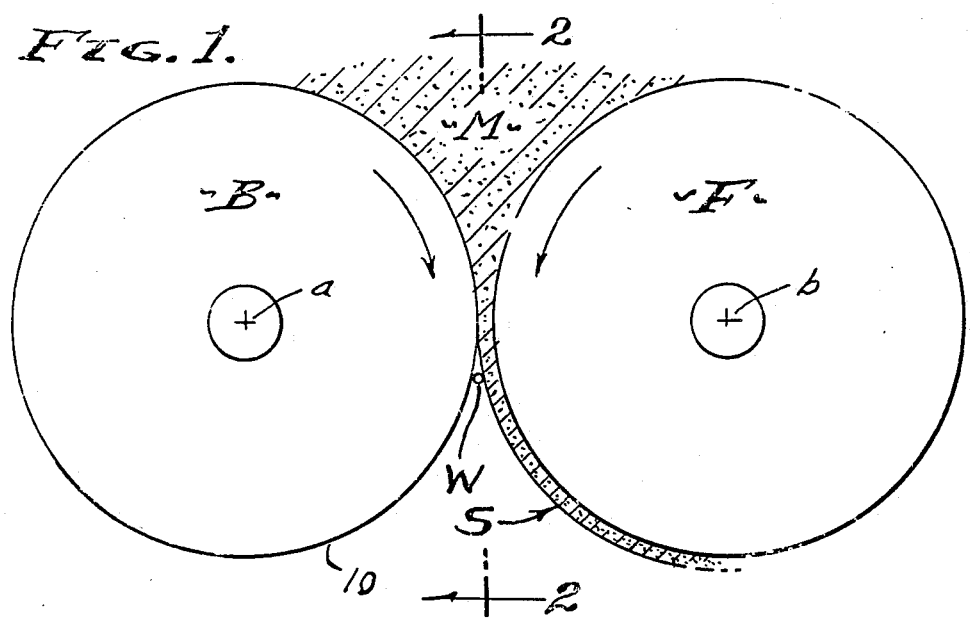
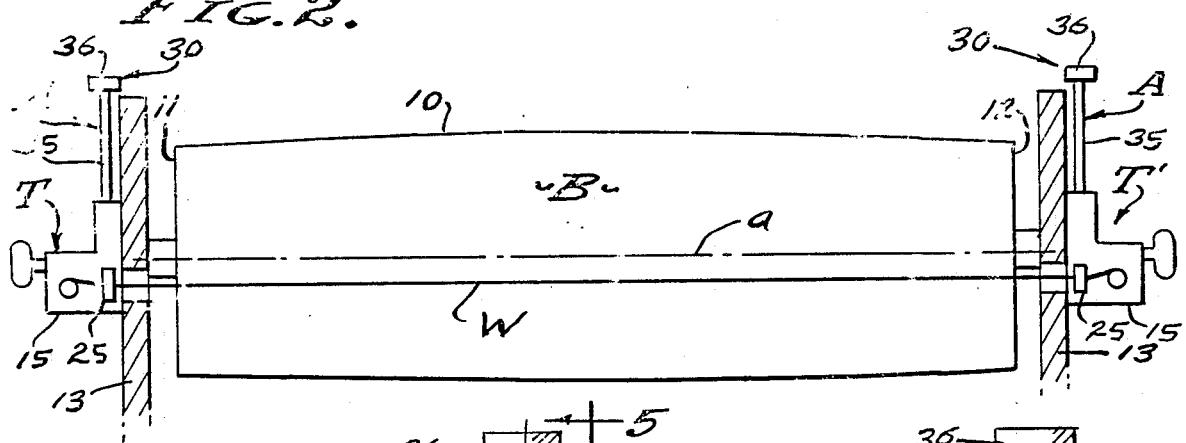
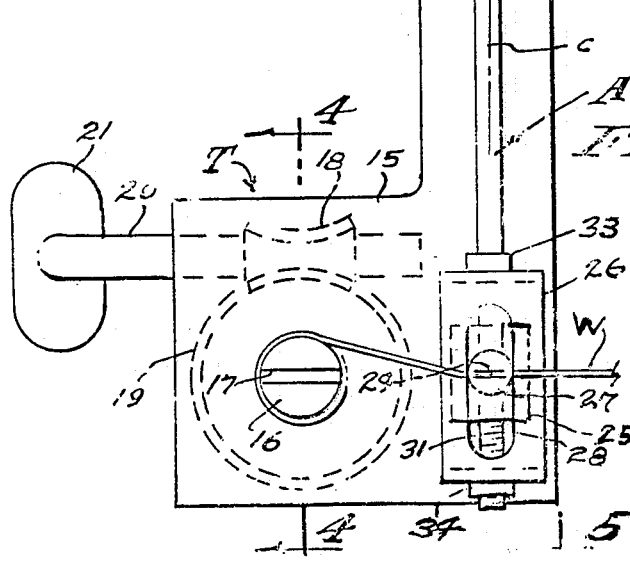
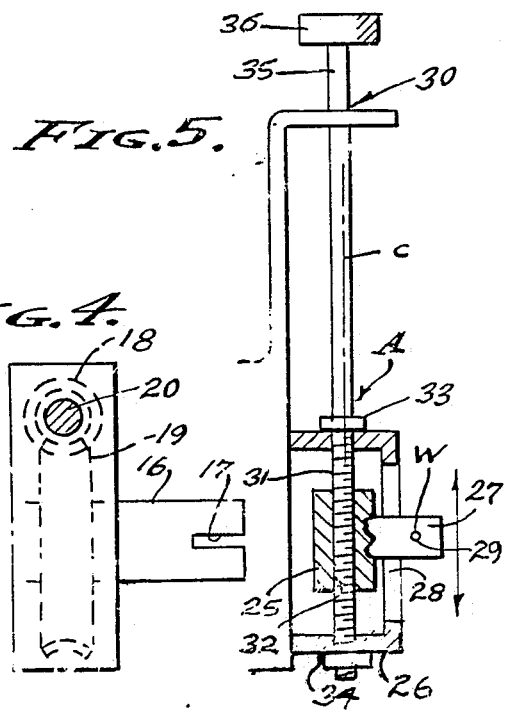

SHEETING HEAD STRIPPER WIRE ADJUSTER

BACKGROUND OF THE INVENTION

This invention relates to food processing machinery and particularly to sheeting heads that are characterized by a pair of rollers through which a supply of prepared dough is formed into a continuous sheet thereof. For example, tortillas and various chips and the like are made from corn flour referred to as "masa", and in the processing sheets of masa difficulties arise in the separation of the formed sheet from one roller to another as the sheet progresses continuously forward during the food processing. Specifically, the masa sheet must be separated from a back roller and transferred onto a front roller.

Sheeting heads used in the processing of masa and like doughs employ stripper wires that separate the formed sheet from the rollers, as may be required. The typical sheeting head is comprised of back and front rollers disposed on horizontally spaced parallel axes, with the requirement that the formed sheet of dough be stripped from the back roller and transferred onto the front roller, and from the front roller to other rollers such as a cutting mold roller, etc., for forward transport and further processing. Wires have been used for this stripping function, but with ever attendant necessity of position adjustment, due to variations in sheet thickness and variations in the physical properties of the dough. That is, the coarseness and adhesive properties of the doughy mass varies, so as to require constant attention to placement of the stripper wires. Although stripper wires are used in combination with each of the various rollers, including the back and front rollers, and the various other rollers, this invention will be shown and described herein as it is combined with the back roller, a most critical combination.

In practice, the back roller has a convexly cambered face juxtaposed to a complementary concavely cambered face of the front roller. The opposed roller faces are textured so as to have traction with the doughy mass, and the stripper wire engages the roller face from which the formed sheet of dough is to be removed or stripped, in this case the convex face of the back roller. This convexity ensures coextensive engagement of the stripper wire with the back roller face, by tensioning the wire tangentially to the opposite end peripheries of said roller. Variations in sheet thickness requires repositioning of the stripper wire as does variations in the physical properties of the doughy mass. That is, the point of separation of the formed sheet of dough is critical with respect to position of the stripper wire, and this position requirement is also critical with respect to those physical properties.

Typical stripper wire is 0.016 to 0.020 inch diameter, of high grade steel piano wire. In practice, this wire is tensioned horizontally and immediately below the desired point of separation between the formed sheet of dough and the face of the roller from which it is being separated.

Heretofore, prior art stripper wires have been adjusted incrementaly by trial and error, and with the sheeting head out of operation. In other words, the food processing is shut down while adjustments are made, and which is time consuming. Typically, the prior art provides notches for incremental adjustment of the stripper wires at opposite ends of the roller, and this requires loosening of the stripper wire followed by its re-positioning and subsequent re-tightening during said shut down time. These adjustments are required many times during the sheeting process and heretofore has resulted in countless hours of down-time while the machine operator seeks to find a satisfactory stripper wire position, all by trial and error method. For each satisfactory adjustment of the stripper wire, several attempts are usually made. Therefore, it is an object of this invention to provide infinitely variable stripper wire adjustment during machine operation without trial and error selection and without shut down time.

With this invention, it is the vertical position of the stripper wire which is adjusted during machine operation, all of which is executed in a matter of moments without stopping the sheeting process. The adjustment is coordinated dynamically with the sheeting process, without shut down and no down time, and all of which substantially if not entirely eliminates waste and/or recycling of the dough as has been previously required during the stripper wire adjustments.

SUMMARY OF THE INVENTION

The sheeting head is a food processing machine that receives a supply of wet sticky dough and draws the same downwardly between a pair of closely juxtaposed rollers. Due to the adhesive properties of the dough, the formed sheet thereof must be separated by means from one roller so as to continue forwardly onto the next roller; otherwise the sheet will adhere randomly to either roller. Therefore, the stripper wire is a necessity, and it requires precise positioning by adjustment means. With the present invention, this adjustment means positions the stripper wire vertically and in coextensive engagment with the face of the roller from which the formed sheet of dough is to be separated. In carrying out this invention, the tensioning of the stripper wire is not disturbed, the anchored ends of the stripper wire being moved vertically in tangential engagement with the end pripheries of the roller from which the sheet of dough is to be removed. The required adjustment is most often minute and made with discretion at the opposite ends of the roller, as may be required, and all of which is performed during full operation of the food processing.

The foregoing and various objects and features of this invention will be apparent and fully understood from the following detailed description of the typical preferred form and applications thereof, throughout which description reference is made to the accompanying drawings.

THE DRAWINGS

FIG. 1 is a sectional view showing the typical relationship of front and back sheeting rollers, with a sheet of dough issuing therebetween and with a stripper wire ensuring separation of the sheet from the back roller and onto the front roller.

FIG. 2 is a view taken as indicated by line 2—2 on FIG. 1 showing the infinitely variable tensioning means of the present invention at opposite ends of a sheeting roller.

FIG. 3 is an enlarged view of the infinitely variable tensioning shown in FIG. 2.

And FIGS. 4 and 5 are sectional views taken as indicated by line 4—4 and 5—5 on FIG. 3.

PREFERRED EMBODIMENT

Sheeting heads characteristically receive a charge of dough or masa M supplied from above and drawn between a pair of back and front rollers B and F, as clearly shown in FIG. 1 of the drawings, the axes a and b thereof being spaced and horizontal. The rollers B and F counterrotate in juxtaposed relation, preferably at the same angular velocity, by gearing or the like and driven synchronously by means not shown. The rollers B and F are generally of right cylinder form and are preferably of the same diameter, with peripheries spaced slightly apart so as to establish the thickness of the masa sheet formed therebetween. In practice, and as exagerated in FIG. 2 of the drawings, the transverse surface 10 cross section of one of said rollers, the roller B as shown, is convexly curved, while the mating front roller F is correspondingly concavely curved. The convexity extending between opposite ends 11 and 12 of the back roller B ensures that a stripper wire W tensioned between the ends 11 and 12 will coextensively engage the surface 10 of the roller and thereby perform the function of separating a formed sheet S of masa from the surface 10 of the back roller and so that said sheet will continue forwardly engaged upon the surface of the front roller. The stripper wire W extends horizontally below a tangential plane coincidental with the two roller axes a and b (see FIGS. 1 and 2).

Carried by frame members 13 and at opposite sides of the sheeting head, there are tensioning means T and T' by which opposite ends of the stripper wire w are secured and tensioned, and at which ends the wire is adjusted vertically. And, it is this vertical adjustment with which this invention is particularly concerned. The tensioning means T and T' are alike and differ only in their right and left hand installation, so that a description of one will suffice for that of the other. As shown, the tensioning means T is comprised of a base 15 that projects from the outside of the frame member 13 and which rotatably carries a spindle 16 to which the stripper wire W is secured, as by tying the same through a bifurcated end 17 of said spindle. In practice, the stripper wire W is wrapped several turns around the spindle 16 prior to tensioning thereby.

The stripper wire is anchored at opposite ends by the tensioning means T and T', tension being applied by turning and holding the rotative positions of the spindles 16. Rotative positioning of the spindles is maintained by means of a self locking worm 18 and gear 19 engaged therewith, as shown best in FIG. 4 of the drawings, the worm being rotated on a shaft 20 that has a manually operable head or key 21 by which the spindle 16 is rotatively positioned.

In accordance with this invention, I provide height adjustment means A for vertically positioning the stripper wire W below the aforementioned plane that extends coincidentally between the axes a and b, and in such a manner that vertical adjustment of the stripper wire can be accomplished during continued operation of the sheeting head. That is, without shut-down of the masa processing, and so that the results of the stripper wire adjustments, both tensioning and vertical positioning, can be observed and immediately known while the sheeting head is in full operation.

Referring now to FIGS. 3 and 5 of the drawings, the adjustment means A involves, generally, a vertically shiftable wire guide 25, and an infinitly variable positioning means 30. The adjustment means A is placed between the frame member 13 and the above described tensioning means T (T'), to precisely control the height of the stripper wire regardless of the height positioning influence thereon inherently applied by the tensioning means as and when the wire rolls onto its spindle 16. In practicing this invention, the wire guide 25 slides up and down as it is aligned by the positioning means 30, said means being accessible at the exterior of the sheeting head and manually adjustable and/or readjustable during sheeting head operation.

The vertically shiftable wire guide 25 is shiftable within a guide bracket 26 for substantial vertical movement, and it has a post 27 projecting horizontally through a vertical guide slot 28 in a vertically disposed portion of the bracket. The guide slot 28 maintains the horizontal position of the post 27 (rotatively) while permitting its vertical adjustment. In accordance with this invention, a guide opening 29 is provided through the post 27 which is an extension of the guide, to pass the end portion of the stripper wire that is tensioned by the tensioning means T (T'). In practice, the guide opening 29 is a small diameter hole very little larger than the stripper wire diameter, aligned with the surface 10 and with the periphery of the back roller B at the opposite ends 11 and 12 thereof. A feature, as clearly shown in FIG. 1 of the drawings, is that the stripper wire W is moved vertically into peripheral engagement with the one roller B, below the aforesaid tangential plane coincidental with the roller axes a and b, the peripheries of the rollers B and F being spaced so as to pass the sheet of masa. Accordingly, opposite end portions of the stripper wire are controlled as to height by the wire guides 25.

The infinitly variable positioning means 30 is operable through the guide bracket 26 to vertically position the wire guide 25, and preferably a double acting screw means that positively positions the wire guide both upwardly and downwardly. In practice, a single pitch fine thread screw 31 is disposed on a vertical axis c and through a threaded opening 32 in the wire guide 25. Axial thrust bearings 33 and 34 carried by the screw 31, or an equivalent means, engage top and bottom faces of the guide bracket 26 to positively position the screw vertically while permitting rotation thereof. A feature is the upward extension 35 of the screw 31 with a manually rotatable knob 36 accessible at the top of the sheeting head. Turning of the screw means accurately positions the wire guide 35 as any operating circumstance may require, the close fitting screw 31 and threaded opening 32 precluding any shifting from the adjustments made.

From the foregoing it will be seen and understood how this height adjustment means A is essential to the continuous operation of the masa processing, eliminating down-time while the necessary stripper wire adjustments are repeatedly made.

Having described only the typical preferred form and application of my invention, I do not wish to be limited or restricted to the specific details herein set forth, but wish to reserve to myself any modifications or variations that may appear to those skilled in the art, as set forth within the limits of the following claims.

I claim:

1. A stripper wire adjuster for a sheeting head used in processing dough into thin sheets of uniform thickness; the sheeting head having counterrotating rollers disposed within frame members and on spaced and parallel horizontally disposed axes and having closely juxtaposed peripheries between which the dough is drawn, there being a stripper wire extending between opposite ends of the rollers and spaced in the direction of roller rotation and away from a plane coincidental with the said parallel axes, the stripper wire being anchored at opposite ends to tensioning means carried outside the frame members to engage against the periphery of one of said rollers, and adjustment means at opposite ends of the one of said rollers for positioning the stripper wire in adjusted spaced relation from said plane coincidental with the said parallel axes, and each adjustment means including a wire guide shiftable in a vertical plane normal to said plane coincidental with the said parallel axes and positioning the stripper wire between the tensioning means and the ends of said one roller, and an accessible infinitely variable positioning means controlling the vertical height position of the wire guide and of the stripper wire into peripheral engagement with the end of said one roller, whereby horizontal height adjustment of the stripper wire can be performed during operation of the sheeting head.

2. The stripper wire adjuster for the sheeting head as set forth in claim 1, wherein the shiftable wire guide is carried by a guide bracket on the frame member to move into tangential alignment with the periphery of the roller that is engaged by the stripper wire positioned thereby.

3. The stripper wire adjuster for the sheeting head as set forth in claim 1, wherein the shiftable wire guide is carried by a guide bracket on the frame member and has an extension through a vertical slot in the guide bracket to move into tangential alignment with the periphery of the roller that is engaged by the stripper wire positioned thereby.

4. The stripper wire adjuster for the sheeting head as set forth in claim 1, wherein the shiftable wire guide is carried by a guide bracket on the frame member and has an extension through a vertical slot in the guide bracket to move into tangential alignment with the periphery of the roller that is engaged by the stripper wire positioned thereby, there being an opening through the wire guide passing the stripper wire from the tensioning means to the roller.

5. The stripper wire adjuster for the sheeting head as set forth in claim 1, wherein the infinitely variable positioning means is a screw means positioning the shiftable wire guide both upwardly and downwardly.

6. The stripper wire adjuster for the sheeting head as set forth in claim 1, wherein the infinitely variable positioning means is a double acting screw means carried by a bracket on the frame member and positioning the shiftable wire guide both upwardly and downwardly.

7. The stripper wire adjuster for the sheeting head as set forth in claim 1, wherein the infinitely variable positioning means is a double acting screw means rotatable between axial thrust bearings of a bracket on the frame member and positioning the shiftable wire guide both upwardly and downwardly.

8. The stripper wire adjuster for the sheeting head as set forth in claim 1, wherein the infinitely variable positioning means is a screw means and comprised of a rotatable screw member manually operable outside of the frame member and positioning the shiftable wire guide both upwardly and downwardly.

9. The stripper wire adjuster for the sheeting head as set forth in claim 1, wherein the infinitely variable positioning means is a double action screw means carried by a bracket on the frame member and comprised of a rotatable screw member manually operable outside of the frame member and positioning the shiftable wire guide both upwardly and downwardly.

10. The stripper wire adjuster of the sheeting head as set forth in claim 1, wherein the infinitely variable positioning means is a double acting screw means rotatable between axial thrust bearings of a bracket on the frame member and comprised of a rotatable screw member manually operable outside of the frame member and positioning the shiftable wire guide both upwardly and downwardly.

11. The stripper wire adjuster for the sheeting head as set forth in claim 1, wherein the shiftable wire guide is carried by a guide bracket on the frame member to move the stripper wire into tangential alignment with the periphery of the roller and positioned thereby, and wherein the infinitely variable positioning means is a screw means positioning the shiftable wire guide both upwardly and downwardly.

12. The stripper wire adjuster for the sheeting head as set forth in claim 1, wherein the shiftable wire guide is carried by a guide bracket on the frame member and has an extension through a vertical slot in the guide bracket to move the stripper wire into tangential alignment with the periphery of the roller and positoned thereby, and wherein the infinitely variable positioning means is a double acting screw means carried by a bracket on the frame member and positioning the shiftable wire guide both upwardly and downwardly.

13. The stripper wire adjuster for the sheeting head as set forth in claim 1, wherein the shiftable wire guide is carried by a guide bracket on the frame member and has an extension through a vertical slot in the guide bracket to move the stripper wire into tangential alignment with the periphery of the roller and positioned thereby, there being an opening through the wire guide passing the stripper wire from the tensioning means to the roller, and wherein the infinitely variable positioning means is a double acting screw means rotatable between axial thrust bearings of a bracket on the frame member and positioning the shiftable wire guide both upwardly and downwardly.

14. The stripper wire adjuster for the sheeting head as set forth in claim 1, wherein the shiftable wire guide is carried by a guide bracket on the frame member to move the stripper wire into tangential alignment with the periphery of the roller and positioned thereby, and wherein the infinitely variable positioning means is a screw means and comprised of a rotatable screw member manually operable outside of the frame member and positioning the shiftable wire guide both upwardly and downwardly.

15. The stripper wire adjuster for the sheeting head as set forth in claim 1, wherein the shiftable wire guide is carried by a guide bracket on the frame member and has an extension through a vertical slot in the guide bracket to move the stripper wire into tangential alignment with the periphery of the roller and positioned thereby, and wherein the infinitely variable positioning means is a double acting screw means carried by a bracket on the frame member and comprised of a rotatable screw member manually operable outside of the frame member and positioning the shiftable wire guide both upwardly and downwardly.

16. The stripper wire adjuster for the sheeting head as set forth in claim 1, wherein the shiftable wire guide is carried by a guide bracket on the frame member and has an extension through a vertical slot in the guide bracket to move the stripper wire into tangential alignment with the periphery of the roller and positioned thereby, there being an opening through the wire guide passing the stripper wire from the tensioning means to the roller, and wherein the infinitely variable positioning means is a double acting screw means rotatable between axial thrust bearings of a bracket on the frame member and comprised of a rotatable screw member manually operable outside of the frame member and positioning the shiftable wire guide both upwardly and downwardly.

* * * * *